(12) United States Patent
Fan et al.

(10) Patent No.: US 12,244,266 B2
(45) Date of Patent: Mar. 4, 2025

(54) SYSTEMS AND METHODS FOR FAULT CLASSIFICATION IN PHOTOVOLTAIC ARRAYS USING GRAPH SIGNAL PROCESSING

(71) Applicants: Jie Fan, Tempe, AZ (US); Sunil Rao, Tempe, AZ (US); Gowtham Muniraju, Tempe, AZ (US); Cihan Tepedelenlioglu, Tempe, AZ (US); Andreas Spanias, Tempe, AZ (US)

(72) Inventors: Jie Fan, Tempe, AZ (US); Sunil Rao, Tempe, AZ (US); Gowtham Muniraju, Tempe, AZ (US); Cihan Tepedelenlioglu, Tempe, AZ (US); Andreas Spanias, Tempe, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 967 days.

(21) Appl. No.: 17/318,046

(22) Filed: May 12, 2021

(65) Prior Publication Data

US 2021/0357703 A1    Nov. 18, 2021

Related U.S. Application Data

(60) Provisional application No. 63/023,620, filed on May 12, 2020.

(51) Int. Cl.
| | | |
|---|---|---|
| H02S 50/00 | (2014.01) | |
| G06F 18/20 | (2023.01) | |
| G06F 18/214 | (2023.01) | |
| G06F 18/22 | (2023.01) | |
| G06F 18/241 | (2023.01) | |
| G06N 20/00 | (2019.01) | |

(52) U.S. Cl.
CPC .......... H02S 50/00 (2013.01); G06F 18/2155 (2023.01); G06F 18/22 (2023.01); G06F 18/241 (2023.01); G06F 18/29 (2023.01); G06N 20/00 (2019.01)

(58) Field of Classification Search
CPC ...... H02S 50/00; G06F 18/2155; G06F 18/22; G06F 18/241; G06F 18/29; G06N 20/00; Y02E 10/50
See application file for complete search history.

(56) References Cited

U.S. PATENT DOCUMENTS

| | | | | |
|---|---|---|---|---|
| 2018/0067697 | A1* | 3/2018 | Lee | G06F 3/0656 |
| 2018/0203974 | A1* | 7/2018 | Venn | G16B 30/00 |
| 2019/0384983 | A1* | 12/2019 | Katoch | G06V 20/46 |
| 2021/0158522 | A1* | 5/2021 | Weisenfeld | G06T 7/0014 |

OTHER PUBLICATIONS

Alam et al., A comprehensive review of catastrophic faults in pv arrays: types, detection, and mitigation techniques, IEEE Journal of Photovoltaics, vol. 5, No. 3, pp. 982-997, 2015.

(Continued)

*Primary Examiner* — Giovanni Astacio-Oquendo
*Assistant Examiner* — Zannatul Ferdous
(74) *Attorney, Agent, or Firm* — Polsinelli PC

(57) ABSTRACT

Various embodiments of a system and associated method for detecting and classifying faults in a photovoltaic array using graph-based signal processing.

20 Claims, 5 Drawing Sheets

(56) References Cited

OTHER PUBLICATIONS

Ali et al, Real time fault detection in photovoltaic systems, Energy Procedia, vol. 111, pp. 914-923, 2017.

Bacha et al., Photovoltaics in microgrids: An overview of grid integration and energy management aspects, IEEE Industrial Electronics Magazine, vol. 9, No. 1, pp. 33-46, 2015.

Bonsignore et al., Neuro-fuzzy fault detection method for photovoltaic systems, Energy Procedia, vol. 62, pp. 431-441, 2014.

Bruckman et al., Statistical and domain analytics applied to pv module lifetime and degradation science, IEEE Access, vol. 1, pp. 384-403, 2013.

Chen et al., Adaptive graph filtering: Multiresolution classification on graphs, 2013 IEEE Global Conference on Signal and Information Processing. IEEE, pp. 427-430, 2013.

Daliento, et al., Monitoring, diagnosis, and power forecasting for photovoltaic fields: a review, International Journal of Photoenergy, vol. 2017, 2017.

Dobos, PVWatts version 1 technical reference, National Renewable Energy Lab, Golden, CO (United States), Tech. Rep., 2013.

Flicker et al., Analysis of fuses for blind spot ground fault detection in photovoltaic power systems, Sandia National Laboratories Report, 2013.

Jiang et al., Automatic fault detection and diagnosis for photovoltaic systems using combined artificial neural network and analytical based methods, 2015 International Joint Conference on Neural Networks (IJCNN). IEEE, pp. 1-8, 2015.

Katoch et al., Shading prediction, fault detection, and consensus estimation for solar array control, in 2018 IEEE Industrial Cyber-Physical Systems (ICPS). IEEE, pp. 217-222, 2018.

King et al., Photovoltaic array performance model. United States. Department of Energy, 2004.

Momeni et al., Fault diagnosis in photovoltaic arrays using gbssl method and proposing a fault correction system, IEEE Transactions on Industrial Informatics, 2019.

Muniraju et al., A cyber-physical photovoltaic array monitoring and control system, International Journal of Monitoring and Surveillance Technologies Research (IJMSTR), vol. 5, No. 3, pp. 33-56, 2017.

Muniraju et al., Distributed spectral radius estimation in wireless sensor networks, 2019 53rd Asilomar Conference on Signals, Systems, and Computers. IEEE, 5 pages, 2019.

Muniraju et al., Location based distributed spectral clustering for wireless sensor networks, 2017 Sensor Signal Processing for Defence Conference (SSPD). IEEE, pp. 1-5, London, Dec. 2017.

Muniraju et al., Max consensus in the presence of additive noise, 2018 52nd Asilomar Conference on Signals, Systems, and Computers. IEEE, pp. 1408-1412, Nov. 2018.

Pires et al., A grid connected photovoltaic system with a multilevel inverter and a le-blanc transformer, International Journal of Renewable Energy Research (IJRER), vol. 2, No. 1, pp. 84-91, 2012.

Rao et al., Solar array fault detection using neural networks, 2019 IEEE International Conference on Industrial Cyber Physical Systems (ICPS). IEEE, pp. 196-200, 2019.

Riley at al., Photovoltaic prognostics and heath management using learning algorithms, 2012 38th IEEE Photovoltaic Specialists Conference, IEEE, pp. 1535-1539, 2012.

Sandryhaila et al., Discrete signal processing on graphs, IEEE transactions on signal processing, vol. 61, No. 7, pp. 1644-1656, 2013.

Sandryhaila et al., Discrete signal processing on graphs: Graph filters, 2013 IEEE International Conference on Acoustics, Speech and Signal Processing. IEEE, pp. 6163-6166, 2013.

Zhang et al., Location estimation and detection in wireless sensor networks in the presence of fading, Physical Communication, Elsevier, vol. 32, pp. 62-74, 2019.

Zhao et al., Fault experiments in a commercial-scale pv laboratory and fault detection using local outlier factor, 2014 IEEE 40th Photovoltaic Specialist Conference (PVSC). IEEE, pp. 3398-3403, 2014.

Zhao et al., Graph-based semi-supervised learning for fault detection and classification in solar photovoltaic arrays, IEEE Transactions on Power Electronics, vol. 30, No. 5, pp. 2848-2858, 2014.

Zhao et al., Line-line fault analysis and protection challenges in solar photovoltaic arrays, IEEE transactions on Industrial Electronics, vol. 60, No. 9, pp. 3784-3795, 2012.

Zhao et al., Outlier detection rules for fault detection in solar photovoltaic arrays, 2013 Twenty-Eighth Annual IEEE Applied Power Electronics Conference and Exposition (APEC), IEEE, pp. 2913-2920, 2013.

Chine et al., A novel fault diagnosis technique for photovoltaic systems based on artificial neural networks, Renew Energy. 2016.

* cited by examiner

SYSTEMS AND METHODS FOR FAULT CLASSIFICATION IN PHOTOVOLTAIC ARRAYS USING GRAPH SIGNAL PROCESSING

CROSS-REFERENCE TO RELATED APPLICATIONS

This is a non-provisional application that claims benefit to U.S. Provisional Patent Application Ser. No. 63/023,620 filed May 12, 2020, which is herein incorporated by reference in its entirety.

GOVERNMENT SUPPORT

This invention was made with government support under 1646542 awarded by the National Science Foundation. The government has certain rights in the invention.

FIELD

The present disclosure generally relates to photovoltaic arrays; and in particular, to systems and methods for fault classification in photovoltaic arrays using graph signal processing.

BACKGROUND

In the last decade, new solar photovoltaic (PV) cell technologies have emerged for grid connected systems. However, automatic fault detection and accurate diagnosis of PV array systems is still an open problem. PV arrays are generally installed in remote locations, and are often subjected to harsh weather conditions. The occurrence of PV faults are unpredictable and requires constant remote monitoring of several parameters. Even when over-current protection devices (OCPD), ground fault detection interrupters (GFDI) and smart monitoring devices (SMDs) with data transmission capabilities are integrated within the PV array system, recent studies have shown that these devices only offer diagnoses for a limited set of commonly occurring faults.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
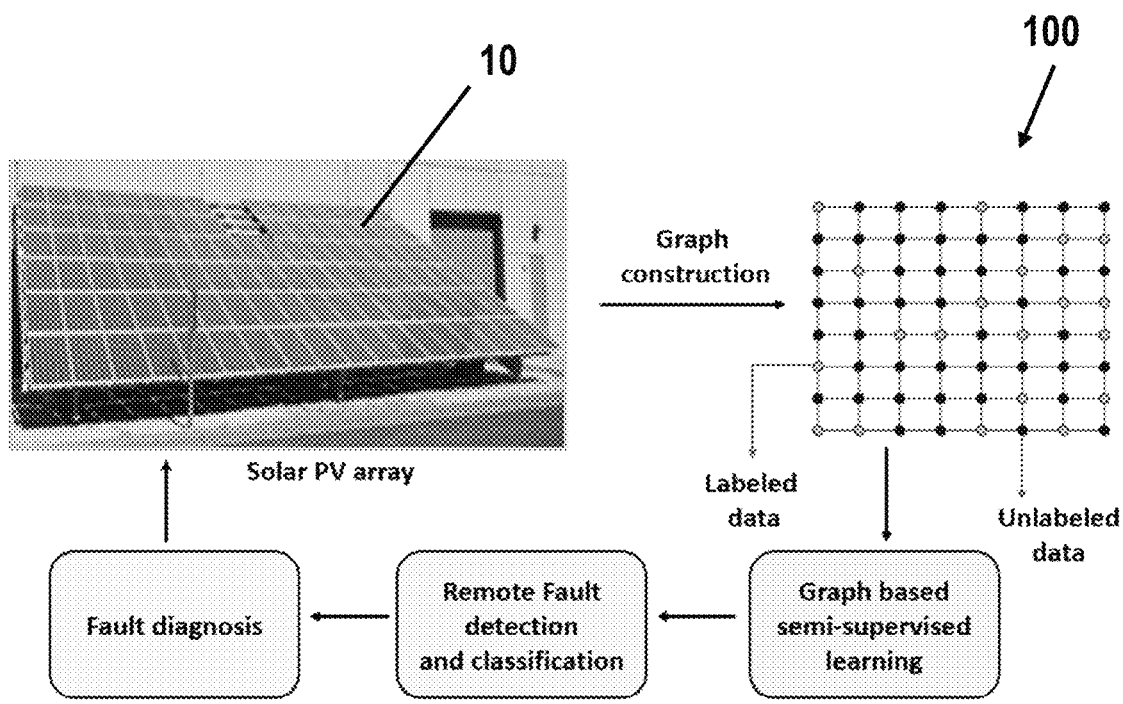
FIG. 1 is a simplified block diagram illustrating a graph-based semi-supervised fault classification and diagnosis system.

Various embodiments of a system and associated method for a graph signal processing-based semi-supervised learning technique which achieves good performance in fault classification with relatively limited data are disclosed herein. More specifically, a semi-supervised graph-based classifier to identify commonly-occurring photovoltaic (PV) faults is disclosed. In some embodiments, a solar PV array is represented as a connected graph having a plurality of nodes representative of each respective panel of the PV array and associated measurable features of the PV modules. First, a classifier is optimized to classify faulty nodes on the data available from labeled nodes. The graph is then used to propagate information from labeled samples to the unlabeled samples for classification of unlabeled samples. Since graph-based methods are semi-supervised, the method requires lower computational cost than conventional supervised machine learning (ML) classifiers and artificial neural networks (ANNs). Referring to the drawings, embodiments of a graph-based semi-supervised fault classification and diagnosis system, herein referred to as "the system", are illustrated and generally indicated as 100 in FIGS. 1-5.

The graph-based semi-supervised fault classification and diagnosis system 100 disclosed herein utilizes graph signal processing (GSP) which avoids computing inverses of matrices. Since matrix inverse scales as $O(N^3)$, the disclosed system 100 is computationally efficient, especially when the dataset dimensions are large, which is often the case for PV arrays 10.

Fault Diagnosis

The problem of fault classification in PV arrays 10 is discussed in this section. Five commonly occurring conditions are identified in PV arrays 10, namely: standard test conditions (STC), shaded modules, degraded modules, soiled modules, and short circuit conditions. The goal of the system 100 is to correctly classify the PV data into classes representative of these conditions via graph signal processing. In order to achieve this, an input feature matrix X 121 is developed for each of the solar PV modules of the PV array 10. The input feature matrix X 121 includes measured or estimated parameters such as open circuit voltage $V_{OC}$, short circuit current $I_{SC}$, maximum voltage $V_{MP}$ and maximum current $I_{MP}$ for each of the nodes (i.e. each individual panel 10A) in the photovoltaic array, as shown in the simplified circuit of FIG. 4. Additionally, in some embodiments it is necessary to include measurements for irradiance levels per hour per day and the corresponding temperature readings.

A PVWatts testing dataset was used for fault classification experiments. The PVWatts dataset is obtained for a period of one year, from January to December of 2006. The dataset includes five classification labels: Standard Test Conditions (STC) and four types of faults; namely, shading, degraded modules, soilig, and short circuit. When shading occurs, the measured power and irradiance are lower than STC, which is usually due to overcast conditions, cloud cover or building obstruction. Degraded modules are caused by wear and tear of aged PV modules. As a result, degraded modules cannot produce the standard rated power. Since PV modules 10 are exposed to the outdoor environment, modules are soiled by dust, snow, bird droppings, etc, resulting in significant degradation of power output. Short circuits are a result of accidental shorting of PV modules 10 due to faulty wires, equipment, etc. Short circuits not only result in power loss but are also a potential fire hazard. Therefore, the reliability of the PV systems 10 can be significantly enhanced by the automatic diagnosis of these faults.

System Overview

Figure 2:
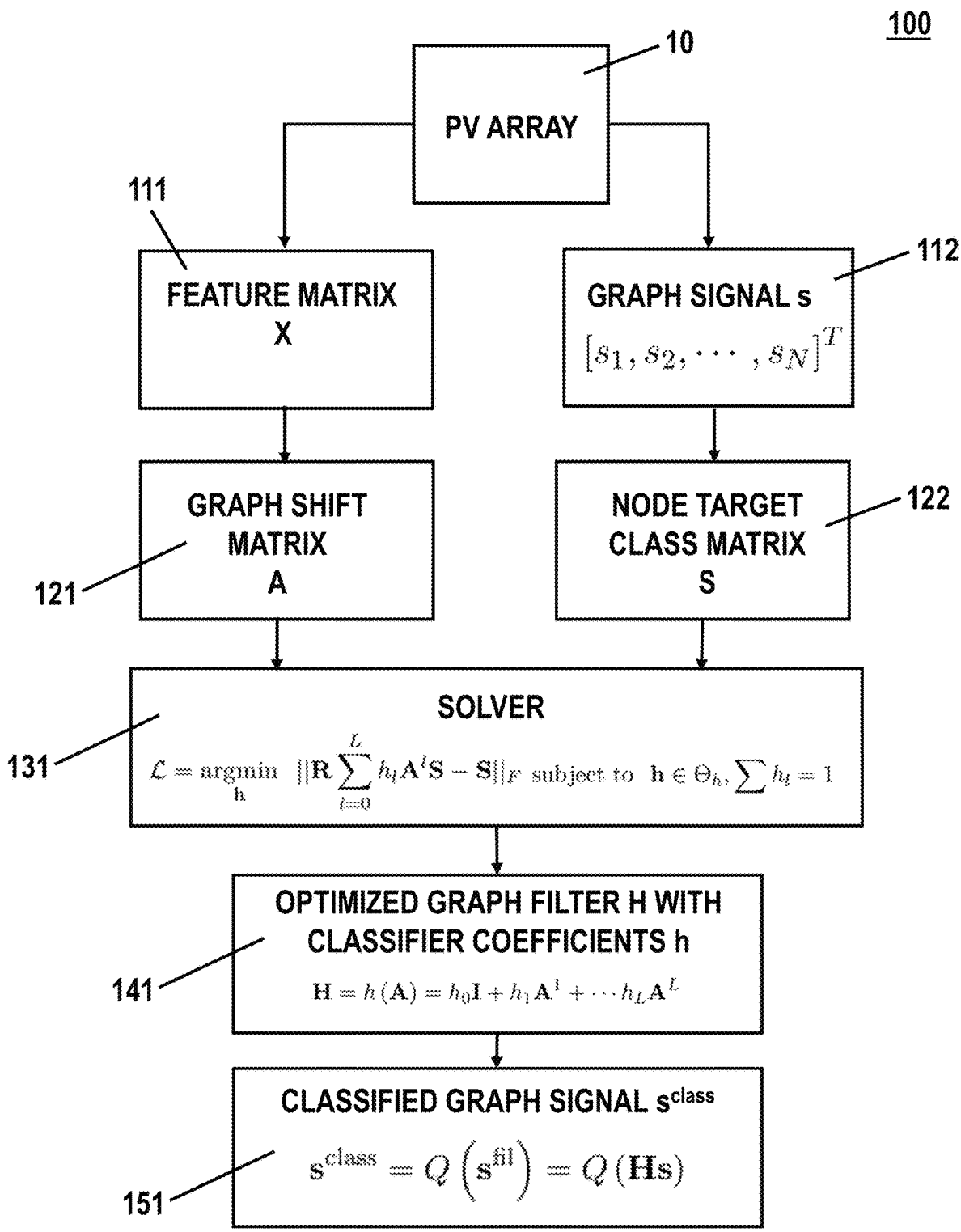
FIG. 2 is a simplified block diagram showing data flow for the system of FIG. 1
Figure 3:
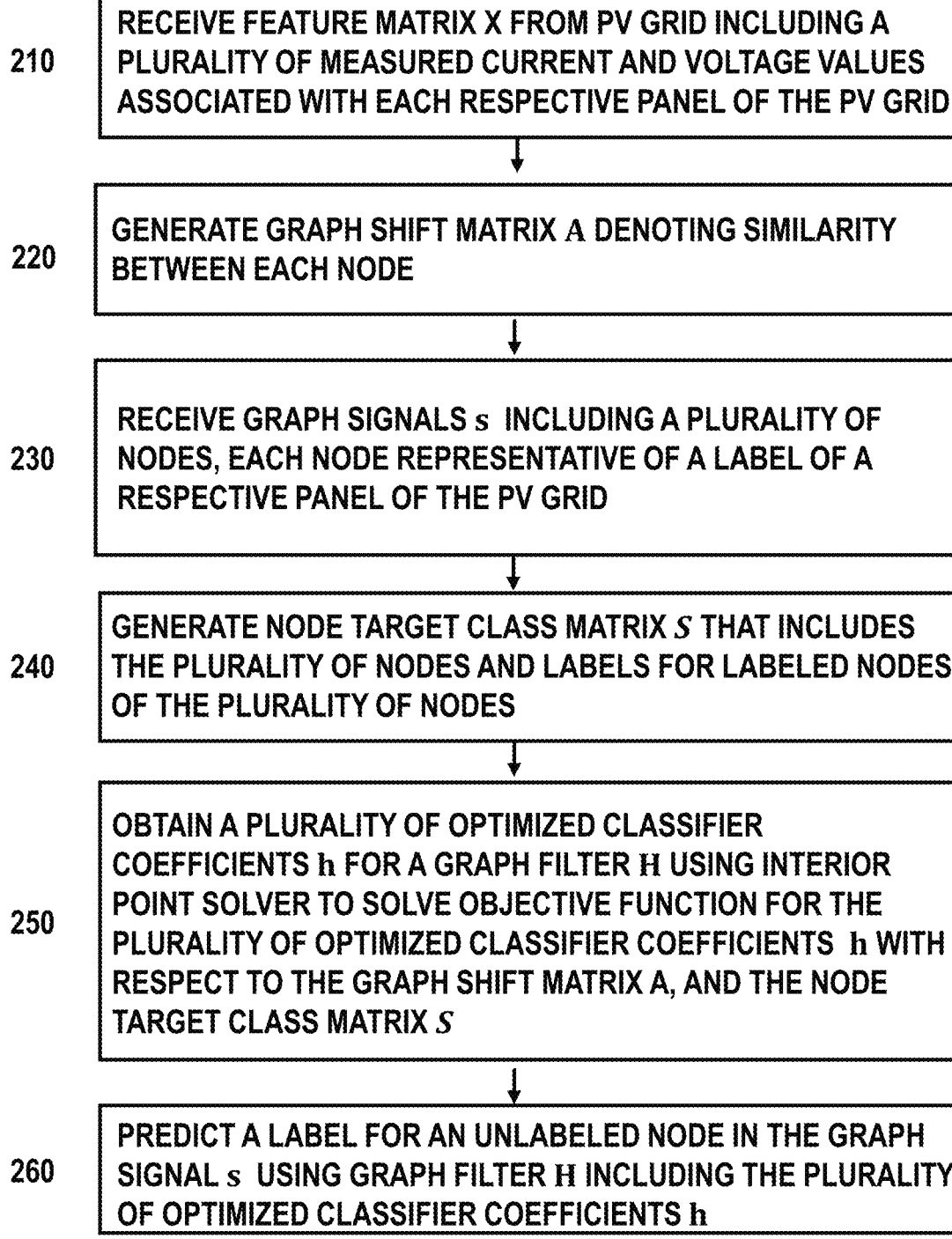
FIG. 3 is a diagram showing a process flow for a method associated with the system of FIG. 1.
Figure 4:
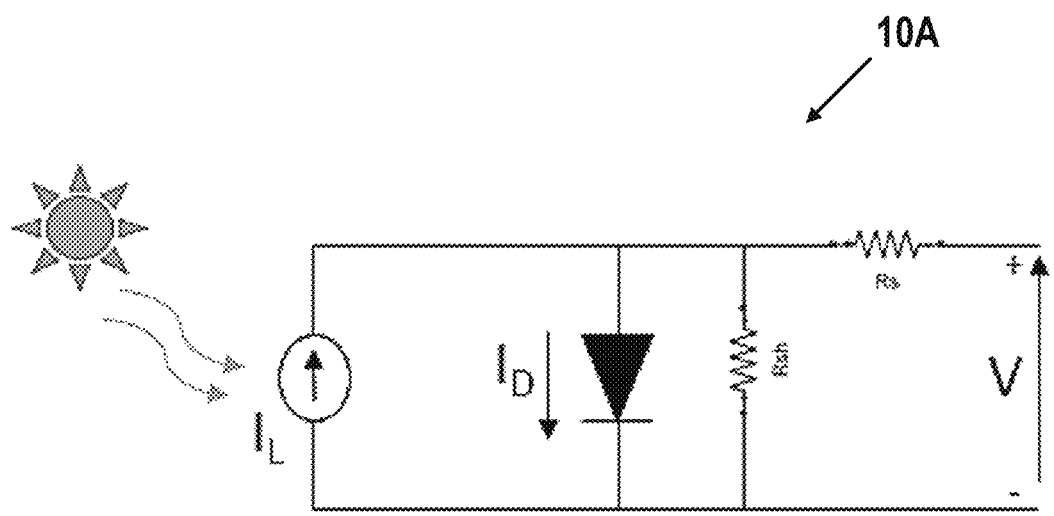
FIG. 4 is a circuit diagram showing a one-diode model of a solar cell of a photovoltaic array.

Referring to FIGS. 2 and 3, a system 100 for fault detection in a PV array 10 is illustrated. In particular, the system 100 receives a feature matrix X at block 111 of FIG. 2 and at block 210 of FIG. 3 including N sets of D features from the PV array 10 having N panels. The features can include aspects such as a plurality of irradiance, current and voltage values that are descriptive of how each individual PV panel is functioning. Each individual PV panel of the PV array 10 is associated with a respective node of a graph G that includes the set of features associated with the node.

At block 121 of FIG. 2 and at block 220 of FIG. 3, the feature matrix X of block 111 is used to generate a graph shift matrix A that is indicative of similarity between each node according to Eq. 5 below.

Each node is further associated with a respective class label, whether predetermined or undetermined, which is in some embodiments descriptive of a fault type of the associated panel. In some embodiments, the dataset X is only partially labeled, with only a portion of the panels being classified. At block 112 of FIG. 2 and at block 230 of FIG. 3 the system 100 further receives K graph signals $s=[s_1, s_2, \ldots, s_N]^T$ where each signal s describes which panels of N panels are classified under a respective class of K classes. To illustrate, consider graph signal associated with a class k:

$$s_k=[0,1,0,\ldots]^T$$

For the illustration, consider $s_k$ is a vector denoting a "shorted" class of panels. A first panel associated with node 1 and a third panel associated with node 3 are given a value of "0" in graph signal $s_k$, denoting that the first and third panels are not labeled as "shorted". A second panel associated with node 2 is given a value of "1" in graph signal $s_k$, denoting that the second panel is labeled as "shorted". It should be noted that a value of "0" does not necessarily indicate that a particular node is completely un-labeled, as the node could be given a value of "1" in another graph signal such as graph signal $s_{k+1}$ that is indicative of another fault type classification. However, if a node is assigned a value of "0" for all K classifications, then the node is unlabeled. The goal of system 100 is to ultimately classify all unlabeled nodes within the dataset using the data from the labeled nodes within the same dataset.

At block 122 of FIG. 2 and at block 240 of FIG. 3 the system 100 further combines the K graph signals s into a node target class matrix S that includes all available classifications of fault type including K columns indicating K classifications for N nodes.

At block 131 of FIG. 2 and at block 250 of FIG. 3, the system 100 uses the graph shift matrix A and the node target class matrix S to find the graph filter H, which classifies the nodes of the PV array 10 into true classes according to Eq. 6 below. In particular, an objective function is solved to find a set of filter coefficients h associated with graph filter H that classify the remaining unlabeled nodes into respective classes of the node target class matrix S based on their respective similarities to other nodes as indicated in graph shift matrix A. At block 141 of FIG. 2, optimized graph filter H with solved filter coefficients h is obtained upon solving the objective function. At block 110 of FIG. 2 and at block 260 of FIG. 3, the graph signal s for each of the K classifications is processed using the optimized graph filter H to obtain an updated graph signal $s^{class}$ for each classification K that labels remaining unlabeled nodes with a correct classification for that node.

Discussion of Graph Signal Processing

Graph and Graph Signal

A graph G=(V,A) has N nodes V={1,2, . . . ,N}, and described by an N×N matrix which characterizes the relationships among all nodes is indicated in FIG. 1. The graph signal is defined as $s=[s_1, s_2, \ldots, s_N]^T$ and, based on the relationship among the nodes, GSP operators can be designed to conduct (propagate) the graph signal s, throughout the graph.

Graph Shift and Graph Filter

GSP translates the traditional digital signal processing (DSP) concepts to the graph domain. Similar to the time shift operation in DSP filters, the graph shift operator is the base of the concept to design a graph filter. Consider a graph shift matrix A, then the graph shift operation is given by:

$$\tilde{s}=As \quad (1)$$

There are numerous choices for the shift matrix A, such as adjacency matrix, Laplacian matrix, normalized versions and other variations on these matrices. In DSP, the task of designing a conventional FIR filter involves finding the optimal filter taps for different time shift components. Similarly, in graph domain, an $L^{th}$ order shift-invariant graph filter is defined as:

$$H=h(A)=h_0 I + h_1 A^1 + \ldots h_L A^L \quad (2)$$

where $h_i$ are scalar coefficients of the graph filter H. Then the graph filter operator H can be conducted on the graph signal s as:

$$s^{fil}=Hs \quad (3)$$

where, $s^{fil}$ denotes the filtered graph signal. In this disclosure, the fault classification is achieved through a graph filtering process.

Semi-Supervised Graph-Based Classification

A graph filter is designed as a classifier to identify the specific types of faults in large scale utility arrays 10. An N×D matrix X is used to represent the initial dataset that has N samples and D features. Similarity among the nodes on the graph is represented by the graph shift matrix. Similarity is estimated based on the Euclidean distance $\rho(\cdot)$ between the nodes, given by $$A_{i,j}=\rho(x_i,x_j) \quad (4)$$

where, $x_i$ and $x_j$ are $i^{th}$ and $j^{th}$ rows of X. The graph shift matrix is generated by, $$A_{i,j}=\frac{\exp(-\rho(x_i, x_j)/\sigma)}{\sum_{k=1}^{N} \exp(-\rho(x_i, x_j)/\sigma)}, \quad (5)$$

where $\sigma$ is a scaling coefficient. Note that the graph shift matrix obtained by equation (5) is the Hermitian transpose of the transition matrix of the graph.

The problem of fault classification translates to the node classification problem on the graph, where each node belongs to a particular class. Consider S to be an N×K matrix that collects the labels of N samples, where each sample belongs to one of the K categories. For nodes with labels, S is one-hot encoded, i.e, if the $i^{th}$ node belongs to $j^{th}$ category, then $S_{i,j}=1$ while the remaining elements of that row are 0. If a node is unlabeled, then all the elements in the corresponding row will be 0.

Given feature matrix X, graph shift matrix A, and the node target class matrix S, the goal is to find the graph filter H, which classifies the nodes into true classes. The filter taps $h_i$ of the filter H is computed by solving a convex objective function, given by:

$$\mathcal{L} = \operatorname{argmin}_h \| R\Sigma_{i=0}^L h_i A^i S - S \|_F, \quad (6)$$

subject to $h \in \Theta_h$, $\Sigma h_i = 1$ where $\|\cdot\|_F$ represents Frobenius norm and R is an N×N diagonal matrix, wherein $R_{i,i}=1$ if $i^{th}$ sample is labeled, otherwise $R_{i,i}=0$. The rectangular domain of filter coefficients $\Theta_h$ can be empirically decided. Since the objective function $\mathcal{L}$ given in equation (6) is a linear least square problem, it can be solved by an interior-point solver. After the filter H is well-trained, the classification result can be obtained by $$s^{class} = Q(s^{fil}) = Q(Hs), \quad (7)$$

where $Q(\cdot)$ is non-linear operator that transforms the largest value in each row to 1 and remaining elements to 0, and $s^{class}$ denotes the class to which the node belongs. As the graph shift matrix contains information from both labeled and unlabeled data, the graph filter is a semi-supervised classifier.

Simulation Set-Up and Results

During experimentation, fault classification was performed on PVWatts dataset. About 4400 measurements per class were obtained corresponding to the entire array. Therefore, this dataset has 22000 data samples, which corresponds to N=22000 nodes in the graph. Each data sample corresponds to one of the five classes. A feature matrix X is adopted with 9 features for every node. The 9 features are namely $V_{OC}$, $I_{SC}$, $V_{MP}$, $I_{MP}$, fill factor, temperature, irradiance, gamma ratio, and maximum power. The goal was to correctly classify each node to one of the 5 test conditions. It was considered that $\alpha\%$ of the samples have labels and the system 100 was tasked with predicting the labels for the rest of the nodes in the graph

TABLE I

Comparison of various Classifiers with different labelling ratio for fault classification in PV arrays
Classification Error

| α | GSP | KNN | RFC | SVM | ANN |
|---|---|---|---|---|---|
| 0.2 | 14.52 | 15.62 | 16.53 | 19.54 | 14.85 |
| 0.3 | 11.45 | 15.02 | 15.85 | 19.45 | 11.92 |
| 0.4 | 11.23 | 14.83 | 15.09 | 19.67 | 11.80 |
| 0.5 | 9.94 | 14.64 | 14.91 | 19.38 | 11.62 |
| 0.6 | 9.42 | 14.02 | 14.07 | 18.32 | 10.24 |
| 0.7 | 9.32 | 13.94 | 13.03 | 18.18 | 9.61 |

First, X is used to generate the graph shift matrix A through equation (5). Next, the interior-point solver is used to solve the objective function given in (6) in order to compute the graph filter coefficients. Note that the graph filter obtained is the fault classifier, which is then used to predict labels for the unlabeled data. Since the ground truth labels for all the nodes are available, the overall error rate is computed and used as the metric to qualitatively evaluate the classifier's performance.

Besides the disclosed approach based on graph signal processing, conventional supervised machine learning classifiers are also applied including random forest classifier (RFC), K-nearest neighbor classifier (KNN) and support vector machines (SVM), and the standard ANNs to classify the PVWatts dataset. An RFC classifier was trained with 300 estimators with a depth of 50. The SVM classifier was trained with a radial basis kernel and the KNN classifier with 30 nearest neighbors. Standard ANNs were considered with 4 hidden layers each with 100 neurons. A Relu activation function was used for the hidden layer and a softmax layer for the output layer. ANN was trained using Adam optimizer with a learning rate of 0.01. These hyper-parameters were selected using brute force grid search and were found to have the best results in each case.

Additionally, the test accuracies and error rates of all classifiers was examined under different labelling ratios a from 0.2 to 0.7. The results are reported in Table I. It was found that, in all cases of α, GSP method significantly outperforms the other methods. GSP had the best error rate performance among all classifiers with 9.32% error followed by ANNS with 9.61%. ANNs performed better than the conventional ML classifiers in all cases. Although the performance ANNs can be improved by adding more data and making the network deeper, it leads to expensive data collection and extra computational resources. KNN and RFC classifiers reach a minimum error rate of 14% and 13% respectively, falling short by about 4.5% with respect to GSP. SVM had the highest error rate among all the classifiers. The superior performance of GSP method can be attributed to the structural graph data along with the measurement data to construct the classifier.

In the present disclosure, a graph signal processing based fault classification system 100 for the solar array 10 is presented. The system 100 constructs the classifier using the measured data as well as the structural connectivity of PV array topology. In addition, the disclosed system 100 requires a significantly lower percentage of labeled data for classification and achieves good performance. To illustrate this point, a comparison of the graph-based system 100 is with the supervised machine learning methods such as KNN, RFC, SVM, and the ANNs was shown in Table 1. Experimental results show that the graph-based method requires the lowest training cost. In contrast to the conventional graph-based classifiers, the disclosed graph filter approach can be trained without calculating the inverse of the matrix, which significantly reduces the algorithm's complexity.

Figure 5:
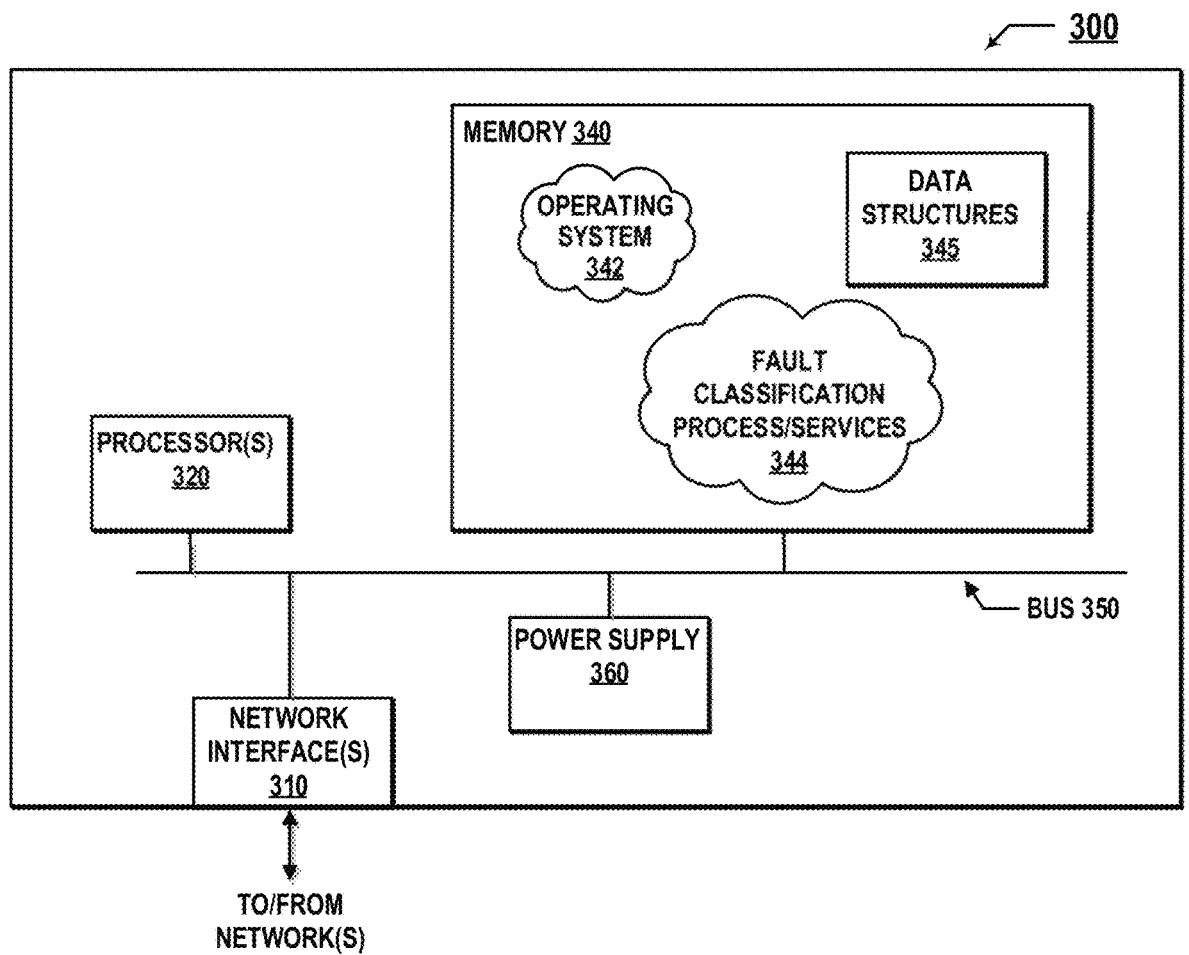
FIG. 5 is a diagram showing an example computing system for execution of various aspects of the system of FIG. 1.

FIG. 5 is a schematic block diagram of an example device 300 that may be used with one or more embodiments described herein, e.g., as a component of system 100.

Device 300 includes one or more network interfaces 310 (e.g., wired, wireless, PLC, etc.), at least one processor 320, and a memory 340 interconnected by a system bus 350, as well as a power supply 360 (e.g., battery, plug-in, etc.).

Network interface(s) 310 contain the mechanical, electrical, and signaling circuitry for communicating data over the communication links coupled to communication network 305. Network interfaces 310 are configured to transmit and/or receive data using a variety of different communication protocols. As illustrated, the box representing network interfaces 310 is shown for simplicity, and it is appreciated that such interfaces may represent different types of network connections such as wireless and wired (physical) connections. Network interfaces 310 are shown separately from power supply 360, however it is appreciated that the interfaces that support PLC protocols may communicate through power supply 360 and/or may be an integral component coupled to power supply 360.

Memory 340 includes a plurality of storage locations that are addressable by processor 320 and network interfaces 310 for storing software programs and data structures associated with the embodiments described herein. In some embodiments, device 300 may have limited memory or no memory (e.g., no memory for storage other than for programs/processes operating on the device and associated caches).

Processor 320 comprises hardware elements or logic adapted to execute the software programs (e.g., instructions) and manipulate data structures 345. An operating system 342, portions of which are typically resident in memory 340 and executed by the processor, functionally organizes device 300 by, inter alia, invoking operations in support of software processes and/or services executing on the device. These software processes and/or services may comprise fault classification process/services 344, described herein with respect to system 100 and method 200. Note that while fault classification process/services 344 is illustrated in centralized memory 340, alternative embodiments provide for the process to be operated within the network interfaces 310, such as a component of a MAC layer, and/or as part of a distributed computing network environment.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules or engines configured to operate in accordance with the techniques herein (e.g., according to the functionality of a similar process). In this context, the term module and engine may be interchangeable. In general, the term module or engine refers to model or an organization of interrelated software components/functions. Further, while the fault classification process 344 is shown as a standalone process, those skilled in the art will appreciate that this process may be executed as a routine or module within other processes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system for determining a classification of one or more nodes of a physical array, comprising:
   a physical array including a plurality of nodes, wherein each node of the plurality of nodes includes a plurality of measurable features and wherein a plurality of labeled nodes are a subset of the plurality of nodes and are labeled according to a respective classification of each labeled node; and
   a processor in communication with a memory module and being operable to execute stored instructions, the stored instructions, when executed, cause the processor to:
      obtain a feature matrix including the plurality of measurable features associated with each respective node of the plurality of nodes;
      generate a graph shift matrix based on the feature matrix, the graph shift matrix being representative of similarity between each node of the plurality of nodes;
      generate a node target class matrix denoting labels for each node of the plurality of nodes, the node target class matrix including a plurality of rows associated with a respective plurality of classifications and wherein each node is represented within each row of the plurality of rows of the node target class matrix;
      determine a set of optimized graph filter coefficients for a graph filter representative of a mapping between the plurality of features of each node of the plurality of nodes and a respective classification for each node of the plurality of nodes based on the graph shift matrix and the node target class matrix; and
      determine a respective classification for each unlabeled node of the plurality of nodes using the graph filter with the set of optimized graph filter coefficients.

2. The system of claim 1, wherein the physical array is a photovoltaic array and wherein the plurality of nodes are each representative of a respective photovoltaic panel of the photovoltaic array.

3. The system of claim 1, wherein the plurality of measurable features include one or more:
   an open circuit voltage;
   an short circuit current;
   an maximum voltage;
   an maximum current; and
   an irradiance.

4. The system of claim 1, wherein a classification corresponds to a respective fault type of an associated photovoltaic panel.

5. The system of claim 1, wherein the graph shift matrix is generated by determining a similarity between each node of the plurality of nodes based on the Euclidean distance $\rho(\cdot)$ between each node of the plurality of nodes, given by $$A_{i,j} = \rho(x_i, x_j)$$

where $x_i$ and $x_j$ are respective $i^{th}$ and $j^{th}$ rows of the feature matrix.

6. The system of claim 1, further comprising stored instructions, the stored instructions, when executed, further cause the processor to:
   obtain a plurality of graph signals that each include a binary value associated with each node of the plurality of nodes, wherein each graph signal of the plurality of graph signals corresponds to a respective classification of the plurality of classifications.

7. The system of claim 6, wherein the node target class matrix is generated from the plurality of graph signals.

8. The system of claim 6, wherein a value of "1" in a row of the node target class matrix associated with a particular classification is indicative that the associated node has a label corresponding to the classification.

9. The system of claim 6, wherein a value of "0" in a row of the node target class matrix associated with a particular classification is indicative that the associated node does not have a label corresponding to the classification.

10. The system of claim 1, wherein the node target class matrix includes both labeled nodes and unlabeled nodes.

11. The system of claim 1, wherein the set of optimized graph filter coefficients are determined by solving a convex objective function with respect to the graph shift matrix and the node target class matrix such that:

$$\mathcal{L} = \mathrm{argmin}_h \|R\Sigma_{l=0}^L h_l A^l S - S\|_F,$$

subject to $h \in \Theta_h$, $\Sigma h_l = 1$ wherein $\|\cdot\|_F$ represents Frobenius norm and R is an N×N diagonal matrix, wherein $R_{i,i}=1$ if $i^{th}$ sample is labeled, otherwise $R_{i,i}=0$, wherein A is the graph shift matrix, and wherein S is the node target class matrix.

12. The system of claim 11, wherein the convex objective function is solved using an interior-point solver.

13. The system of claim 1, wherein respective classification for each unlabeled node of the plurality of nodes is determined by applying the graph filter to each graph signal of the plurality of graph signals to generate a set of fully labeled graph signals.

14. A method for determining a classification of one or more nodes of a physical array, comprising:
obtaining a feature matrix including a plurality of measurable features associated with each respective node of a plurality of nodes of an array, wherein a plurality of labeled nodes are a subset of the plurality of nodes and are labeled according to a respective classification of each labeled node;
generating a graph shift matrix based on the feature matrix, the graph shift matrix representative of similarity between each node of the plurality of nodes;
generating a node target class matrix denoting labels for each node of the plurality of nodes, the node target class matrix including a plurality of rows associated with a respective plurality of classifications and wherein each node is represented within each row of the plurality of rows of the node target class matrix;
determining a set of optimized graph filter coefficients for a graph filter representative of a mapping between the plurality of features of each node of the plurality of nodes and a respective classification for each node of the plurality of nodes based on the graph shift matrix and the node target class matrix; and
determining a respective classification for each unlabeled node of the plurality of nodes using the graph filter with the set of optimized graph filter coefficients.

15. The method of claim 14, further comprising:
obtaining a plurality of graph signals that each include a binary value associated with each node of the plurality of nodes, wherein each graph signal of the plurality of graph signals corresponds to a respective classification of the plurality of classifications.

16. The method of claim 15, further comprising:
generating the node target class matrix from the plurality of graph signals.

17. The system of claim 15, wherein a value of "1" in a row of the node target class matrix associated with a particular classification is indicative that the associated node has a label corresponding to the classification and wherein a value of "0" in a row of the node target class matrix associated with a particular classification is indicative that the associated node does not have a label corresponding to the classification.

18. The method of claim 14, further comprising:
solving a convex objective function with respect to the graph shift matrix and the node target class matrix such that:
$$\mathcal{L} = \mathrm{argmin}_h \| R \Sigma_{l=0}^L h_l A^l S - S \|_F,$$
subject to $h \in \Theta_h$, $\Sigma h_l = 1$
wherein $\|\cdot\|_F$ represents Frobenius norm and R is an N×N diagonal matrix, wherein $R_{i,i}=1$ if $i^{th}$ sample is labeled, otherwise $R_{i,i}=0$, wherein A is the graph shift matrix, and wherein S is the node target class matrix.

19. The method of claim 14, further comprising:
applying the graph filter to each graph signal of the plurality of graph signals to generate a set of fully labeled graph signals.

20. The method of claim 14, further comprising:
determining a similarity between each node of the plurality of nodes based on the Euclidean distance $\rho(\cdot)$ between each node of the plurality of nodes, given by
$$A_{i,j} = \rho(x_i, x_j)$$
where $x_i$ and $x_j$ are respective $i^{th}$ and $j^{th}$ rows of the feature matrix.

* * * * *